(12) United States Patent
Wivagg

(10) Patent No.: US 6,467,814 B1
(45) Date of Patent: Oct. 22, 2002

(54) RETAINING APPARATUS FOR CONNECTING A PIPE SYSTEM TO A VESSEL IN A NUCLEAR REACTOR

(75) Inventor: Adrian P. Wivagg, Tolland, CT (US)

(73) Assignee: Westinghouse Electric Company, Pittsburgh, PA (US)

( * ) Notice: Subject to any disclaimer, the term of this patent is extended or adjusted under 35 U.S.C. 154(b) by 0 days.

(21) Appl. No.: 09/531,408

(22) Filed: Mar. 20, 2000

(51) Int. Cl.[7] .................................................. F16L 41/00
(52) U.S. Cl. ...................... 285/205; 285/323; 285/140.1; 285/213
(58) Field of Search ............................ 285/322, 140.1, 285/142.1, 213, 215, 323, 205

(56) References Cited

U.S. PATENT DOCUMENTS

| | | | | |
|---|---|---|---|---|
| 3,568,977 A | * | 3/1971 | Nelson | 251/148 |
| 4,169,572 A | * | 10/1979 | Simon | 285/322 |
| 4,482,172 A | * | 11/1984 | DeVera et al. | 285/140.1 |
| 5,353,445 A | * | 10/1994 | Denzin | 285/140.1 |
| 5,735,551 A | | 4/1998 | Whitman et al. | |
| 5,737,380 A | | 4/1998 | Deaver et al. | |
| 5,912,936 A | | 6/1999 | Charnley et al. | |
| 5,967,564 A | | 10/1999 | Gaucherot | |

* cited by examiner

Primary Examiner—Lynne H. Browne
Assistant Examiner—Aaron Dunwoody

(57) ABSTRACT

Apparatus has a vessel fitting (2) and a retainer (10) that connect a core spray pipe system (4) to an opening (14) in a wall (8) in a vessel (9) in a boiling water nuclear reactor. The vessel fitting (2) has a plurality of resilient beams (76a), (766b), (76c), (76d), 76(e) and 76(f) arranged to extend into the opening (14) and lock the vessel fitting (2) in place on the vessel. The retainer (10) is installed on the vessel fitting (2) by inserting it through a passage (79) in the vessel fitting (2). The retainer (10) bears against the beams to maintain them in locking engagement with the vessel.

20 Claims, 4 Drawing Sheets

RETAINING APPARATUS FOR CONNECTING A PIPE SYSTEM TO A VESSEL IN A NUCLEAR REACTOR

FIELD OF THE INVENTION

This invention relates generally to retaining apparatus and more particularly to apparatus for connecting a core spray line pipe system to an opening in the wall of a vessel in a nuclear reactor.

BACKGROUND

The boiling water reactor industry has experienced extensive cracking of internal reactor components. The core spray line piping system is of particular interest as the pipe joints can provide many possible leak paths.

In a typical core spray line, the piping enters the vessel through a safe end above the shroud and immediately goes into a T-head that divides the flow into two pipes. It will be appreciated that a safe end as used herein refers to a coupling pipe used to create a fluid path between two pipes fabricated of dissimilar metals. The coupling pipe is constructed of a material compatible with the pipe sections to be joined.

Within the core spray piping system, each pipe curves around the interior of the vessel until it reaches a downcomer, with one or more supports along the path. The downcomer extends down to the shroud where it enters through another safe end and terminates in a T-head located in the sparger at the top of the shroud.

There are two pipes per unit that serve four half circle spray spargers in the shroud. In existing systems, the joints are typically welded and subject to cracking, thus creating a leak path.

If cracks are found in the core spray line, it may be more advantageous to replace the cracked pipe than to leave the pipe in place and attempt repairs of the cracks. Removal of the cracked pipes will oftentimes necessitate the removal of the existing joint structure adjacent the T-head that connects the core spray pipe system to the vessel.

Installing a new joint structure similar to the one that is removed will typically involve welding various components together, which may not be desirable since the welding process can increase the possibility of corrosion and cracking. Additionally, welding processes may not be desirable from the standpoint of the time that it will take to complete. Preferably, the pipe replacement process will minimize worker exposure time and the time that the plant may be shutdown for maintenance and repair.

SUMMARY

According to one aspect of the invention, apparatus is provided for connecting a pipe system to an opening in a vessel in a nuclear reactor that comprises a vessel fitting adapted for installation on the vessel, the vessel fitting including a first side, a second side, and a passage extending therethrough. The first side is adapted to sealably engage the vessel adjacent the opening, and the second side is adapted to sealably engage the pipe system and position the passage in fluid communication with the pipe system.

A plurality of resilient beams are arranged to extend into the opening and position the passage in at least partial alignment with the opening. Each beam comprises a proximate end adjacent the passage and extends away from the first side to a distal end, and a lock member adapted to lockably engage the vessel when the vessel fitting is installed on the vessel. Thus, when the vessel fitting is in an installed condition on the vessel, the first side forms a substantially leakproof seal with the vessel adjacent the opening, the lock member retains the vessel fitting on the vessel, and the pipe system is in fluid communication with the opening.

According to another aspect of the invention, each lock member is adapted to lockably engage a ledge in the opening.

According to another aspect of the invention, the lock members each have a forward actuator surface adapted to slideably engage the vessel and move the plurality of beams from an unflexed position into a flexed position when the vessel fitting is in a partially installed condition during its installation onto the vessel.

According to another aspect of the invention, each lock member has a rear actuator surface adapted to resiliently bear against the ledge when the vessel fitting is in an installed condition.

According to another aspect of the invention, the lock members are adjacent respective distal ends on the plurality of beams.

According to another aspect of the invention, the second side is adapted to sealably engage at least one pipe fitting in the pipe system.

According to another aspect of the invention, the second side is adapted to sealably engage at least one pipe in the pipe system.

According to another aspect of the invention, the second side is adapted to receive a plurality of fasteners for connecting the vessel fitting to the pipe system.

According to another aspect of the invention, apparatus comprising a vessel fitting and a retainer fitting is provided for connecting a pipe system to an opening in a vessel in a nuclear reactor. The vessel fitting is adapted for installation on the vessel and includes a first surface adapted to sealably engage the vessel adjacent the opening, a second surface, a passage extending therethrough, and a plurality of resilient beams extending away from the first surface that are arranged to extend into the opening and position the passage in at least partial alignment with the opening. Each beam comprises a lock member adapted to lockably engage the vessel when the vessel fitting is installed on the vessel.

The retainer fitting is adapted for installation onto the vessel fitting. It includes a flange with a first side and a second side, a barrel with a near end adjacent the first side and extending to a far end, a pipe fitting portion connected to the second side, and a fluid path extending therethrough.

The barrel is adapted to extend through the passage and bear against the plurality of beams when the retainer fitting is installed in the vessel fitting, with the fluid path in at least partial alignment with the opening. The first side is adapted to sealably engage the second surface, and the pipe fitting portion is adapted to sealably engage the pipe system and position the fluid path in fluid communication with the pipe system.

Thus, when the vessel fitting is in an installed condition on the vessel, and the retainer fitting is in an installed condition on the vessel fitting, the first surface forms a first substantially leakproof seal with the vessel adjacent the opening, the second surface forms a second substantially leakproof seal with the first side, the pipe system is in fluid communication with the opening, and the barrel retains the lock members in lockable engagement against the vessel.

According to another aspect of the invention, the barrel has an external surface with a plurality of slots formed therein, wherein each slot extends from at least about the near end to at least about the far end of the barrel, and wherein the plurality of slots are arranged to slideably engage the plurality of beams.

According to another aspect of the invention, apparatus comprising a vessel fitting and a retainer is provided for connecting a pipe system to an opening in a vessel in a nuclear reactor. The vessel fitting is adapted for installation on the vessel and has a first surface, a second surface, a passage extending therethrough, and a plurality of resilient beams extending away from the first surface. The beams are arranged to extend into the opening and position the passage in at least partial alignment with the opening. Each beam comprises a lock member adapted to lockably engage the vessel when the vessel fitting is installed on the vessel.

The retainer is adapted for installation on the vessel fitting and includes a flange having a first side adapted to sealably engage the second surface and a second side adapted to sealably connect to a pipe fitting in the pipe system, a barrel with a near end adjacent the first side and extending to a far end, and a fluid path extending therethrough. The barrel is adapted to extend through the passage and bear against the plurality of beams when the retainer is installed in the vessel fitting with the fluid path in at least partial alignment with the opening.

Thus, when the vessel fitting is in an installed condition on the vessel, and the retainer is in an installed condition on the vessel fitting, the first surface forms a first substantially leakproof seal with the vessel adjacent the opening, the second surface forms a second substantially leakproof seal with the first side, the pipe system is in fluid communication with the opening, and the barrel retains the lock members in lockable engagement with the vessel.

DETAILED DESCRIPTION

Figure 1:
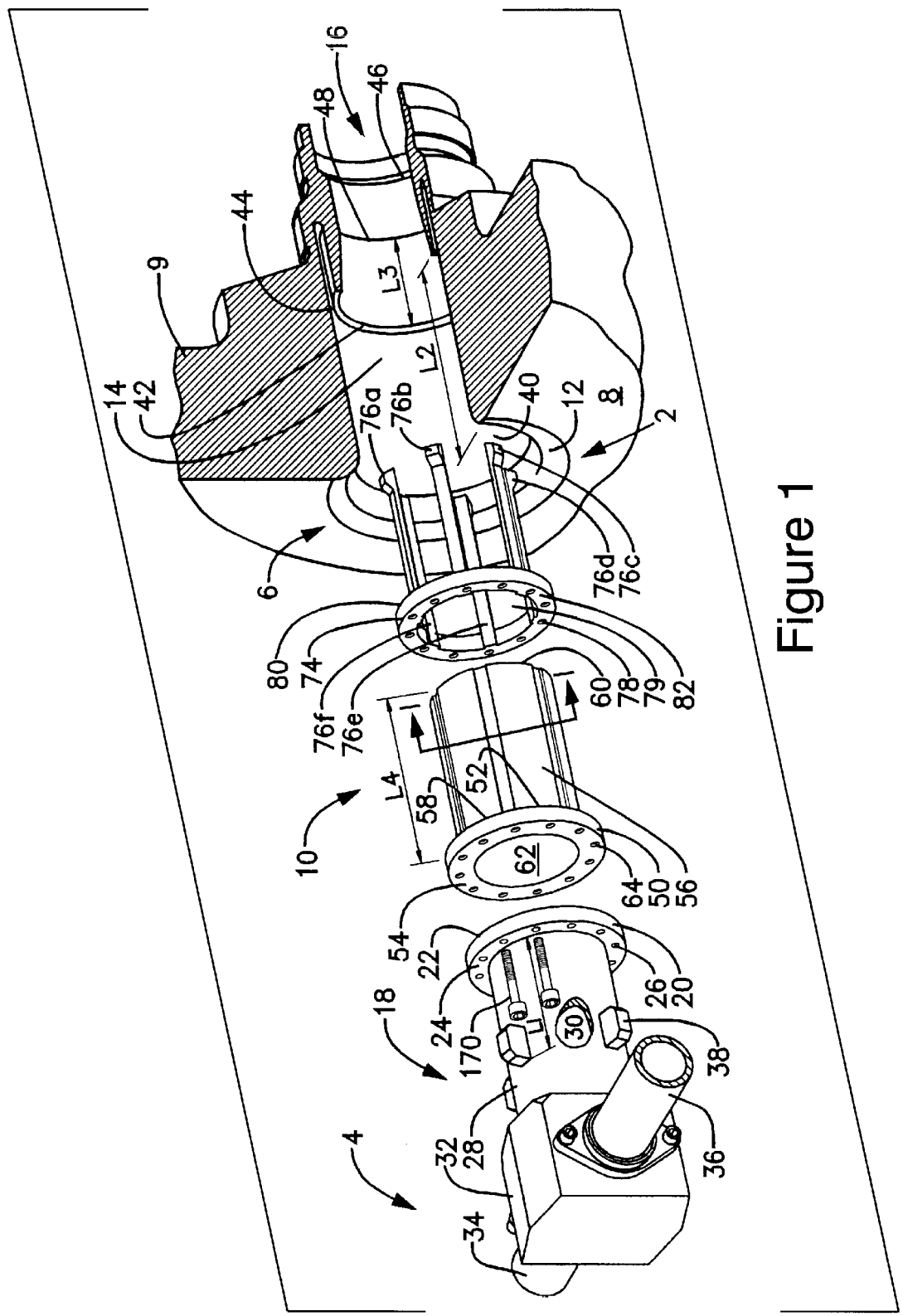
FIG. 1 is a perspective view of an embodiment having features found on the present invention.

FIG. 1 depicts an apparatus embodying features found on the present invention. The apparatus includes a vessel fitting (2) that is adapted to connect a core spray pipe system (4) to an opening (6) in a wall (8) in vessel (9) in a nuclear reactor, and a retainer (10) that is installed into the vessel fitting (2).

The opening (6) can include a curved surface (12), a breech portion (14), and an orifice (16). This configuration of the vessel wall and opening may be found upon a newly manufactured vessel, or upon a reworked vessel in which the core spray pipe system is being replaced.

The pipe system (4) depicted in FIG. 1 comprises a pipe fitting (18) having a flange (20) with a first side or surface (22) and a second side or surface (24). The pipe system flange (20) is at the end of the pipe fitting facing the retainer and includes a plurality of bolt holes (26). A tubular body (28) with an internal fluid passage (30) extends from the flange (20) to a T-head (32) which places the internal fluid passage into fluid communication with pipes (34) and (36).

A plurality of shims (38) are connected to the tubular body at a desired distance (L1) from the second side (24) of pipe fitting flange (20). In at least some applications, the tubular body (28) and flange (20) are sized with respective diameters that will permit at least a portion of the tubular body to be inserted into the breach portion (14) of the opening (6). In such applications, the tubular body (28) will have a sufficient length to position pipes (32) and (34) a desired distance (not shown) from the wall (8) when the pipe system (4) is connected to an installed retainer (10) or an installed vessel fitting (2). In such applications the distance (L1) is selected to position shims (38) within the opening, and the shims will extend far enough from the tubular body to contact or at least be in close proximity to wall (40) in breach portion (14).

The breach portion (14) extends a length (L2) from wall (8) to mating surface (42). The mating surface (42) is stepped in from the breach portion wall (40) to define an orifice opening (44) which has a smaller diameter than the breach portion (14). Orifice wall (46) extends from the mating surface (42) a distance (L3) to an angled ledge (48), at which point the orifice opens up to a larger diameter.

The retainer (10) includes a circular flange (50) with a first side or surface (52), a second side or surface (54), and a circular barrel (56) with a near end (58) adjacent the flange (50) and extending away from the first side or surface (52) to a far end (60). The distance between the near and far ends defines a barrel length (L4).

Figure 2:
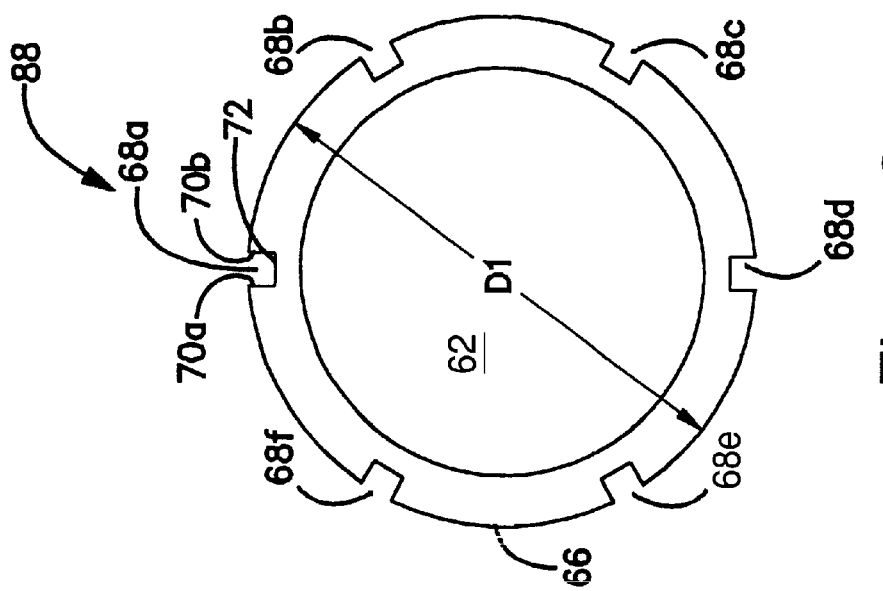
FIG. 2 is a sectional view, taken along lines 1—1 in FIG. 1, of the retainer barrel cross section.

A fluid path (62) extends entirely through the retainer. The flange (50) is sized to correspond to the size of pipe fitting flange (20), and includes a plurality of bolt holes (64) arranged to correspond to bolt holes (26) on pipe fitting flange (20). The external configuration of the barrel (56) is shown in greater detail with reference to FIG. 2.

The barrel has an external surface (66) with a diameter (D1) with six slots (68a), (68b), (68c), (68d), (68e) and (68f) formed therein which are substantially evenly spaced along the circumference of the barrel. The barrel may, if desired, include more or less then six slots as shown. The slots are substantially identical and extend the full distance (L4) as shown in FIG. 1. The cross section configuration of each slot is defined by slot side walls (70a) and (70b) and slot bottom wall (72)

The vessel fitting (2) includes a circular flange (74) and a plurality of beams (76a), (76b), (76c), (76d), (76e) and (76f) extending therefrom. The flange (74) has a diameter corresponding to the diameter of the retainer flange (50), a plurality of tapped holes (78) arranged to correspond to bolt holes (64) in retainer flange (50), and a passage (79) extending therethrough. The flange includes a first side or surface (80) and a second side or surface (82).

Figure 3:
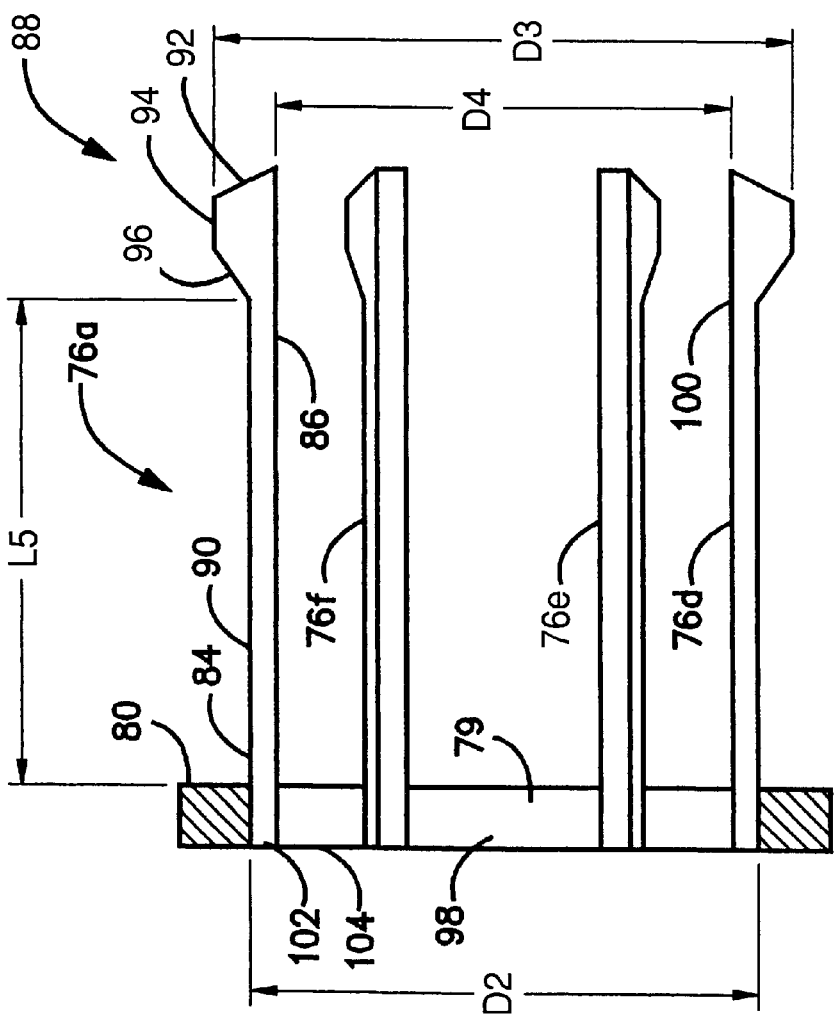
FIG. 3 is a side view, with portions cut away, of a vessel fitting as shown in FIG. 1.

Each beam is preferably identical to the other beams, and the construction of the beams is shown in greater detail in FIG. 3. As shown with reference to beam (64a), each beam has a proximate end (84) adjacent the passage (79), and each beam extends away from the first side or surface (80) to a distal end (86). A lock member (88) is positioned adjacent distal end (86) on a beam outer surface (90). The lock member (88) includes a forward sloping actuator surface (92), a top surface (94) and a rear sloping actuator surface (96). The rear sloping surface (96) is positioned a distance (L5) from the first side or surface (80). The beams are arranged evenly spaced circumferentially on the passage surface (98) which has a diameter (D2). In this arrangement, the top surfaces (96) on lock members (88) are spaced a diametrical distance (D3) from each other. Outer beam surfaces (90) are spaced a diametrical distance (D2) from each other, and beam inner surfaces (100) are spaced a diametrical distance (D4) from each other.

The beams are arranged to correspond to the arrangement of the slots in barrel (56). Each beam has a thickness (102) and a width (104). The beam dimensions and materials are selected to give the beams a desired degree of flexibility, as will be subsequently explained in greater detail.

Figure 4:
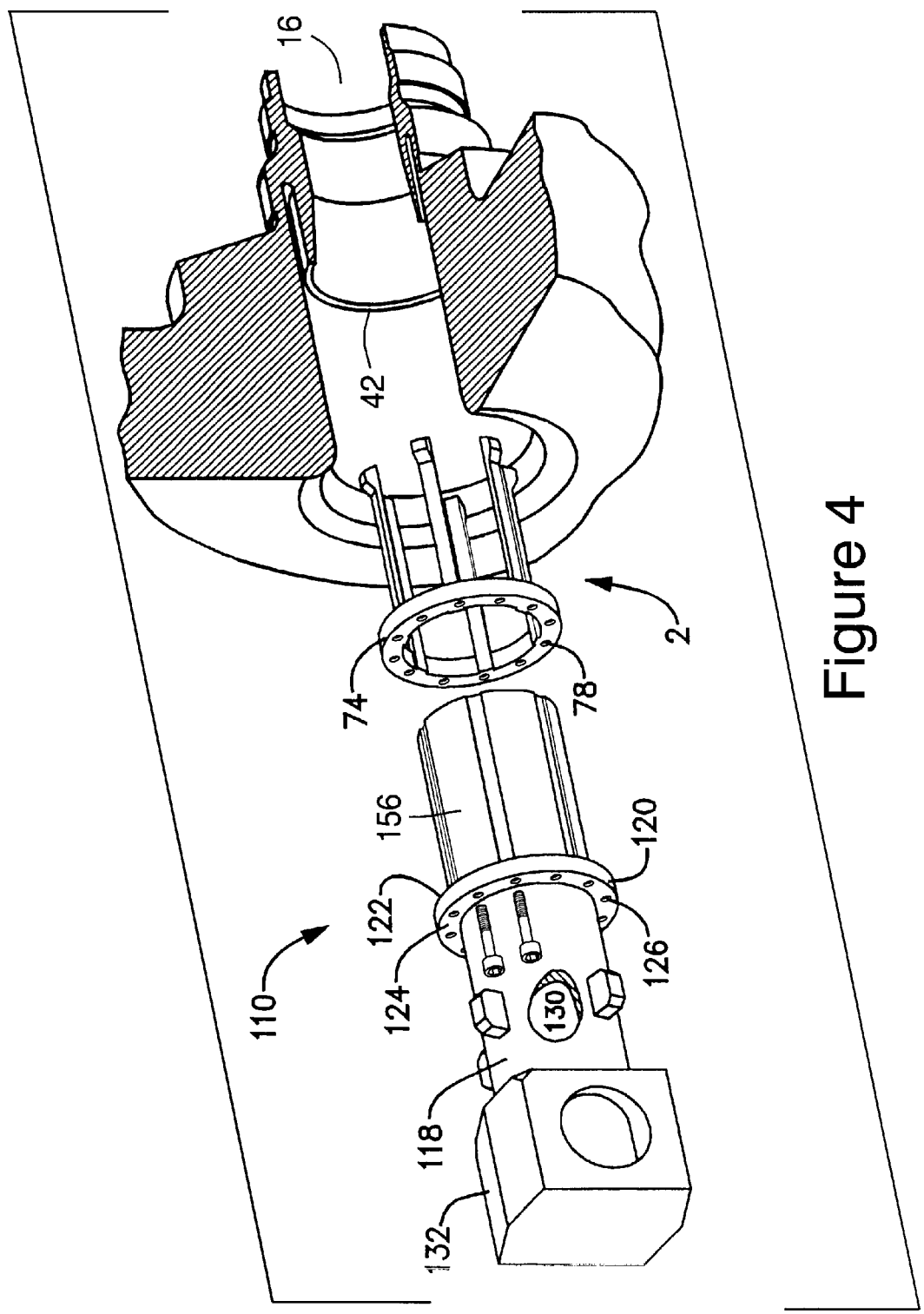
FIG. 4 is a perspective view of an alternative embodiment having features found on the present invention.

An alternative embodiment of an apparatus having features found on the present invention is shown in FIG. 4. This embodiment can be used in a vessel wall (8) and opening (6) having the same configuration as those previously described with reference to FIG. 1. This embodiment utilizes the same vessel fitting (2) used in the previously described embodiment.

A retainer fitting (110) includes a pipe fitting (118) connected to a flange (120) that has a first side or surface (122) and a second side or surface (124). The pipe fitting (118) can be constructed similarly to the pipe fitting (18) described with reference to FIG. 1, and extends from the second side or surface (124) to a T-head (132). The T-head is adapted to connect to a pipe system comprising two pipes (not shown) and place internal fluid passage (130) in fluid communication with the pipes.

A circular barrel (156) is connected to and extends from the first side or surface (122). The barrel (156) can be constructed similarly to the barrel (56) previously described with reference to FIGS. 1 and 2. A plurality of holes (126) is provided in flange (120) that correspond to the tapped holes (78) in vessel fitting flange (74).

The components described herein are constructed from a material such as stainless steel that is suitable for use in the nuclear reactor environment. The components can be fabricated with metalworking techniques known to those skilled in the art, but such techniques preferably do not include welding. If welding is used, then the weld will be subjected to suitable heat treatment, known to those skilled in the art, that will affect the components material properties in a way that will reduce the component's susceptibility to corrosion and cracking.

Having described the construction of embodiments with features found on the present invention, the use of the invention will now be explained.

A vessel wall (8) with an opening (6) can be provided or modified to the desired configuration. A vessel fitting (2) is provided in which the vessel fitting flange (74) is sized for insertion into breach portion (14), and wherein the first side or surface (80) is adapted to sealably engage the mating surface (42) adjacent the orifice opening (44). The plurality of beams (76a), (76b), (76c), (76d), (76e) and (76f) are arranged for insertion into the orifice (16) to facilitate the alignment of vessel fitting passage (79) with orifice opening (44). Surface (42) may be fabricated into an existing portion of the vessel or pipes retained therein at a desired location to establish a desired distance (L3).

The lock members (88) on the beams are positioned a distance (L5) which is substantially the same as the distance from the mating surface (42) to the ledge (48). The diametrical distance (D2) between beam outer surfaces (90) is selected to be the same as or slightly less than the diameter of the orifice (16), and the diametrical distance (D3) is selected to be slightly greater than the diameter of orifice.

Figure 5:
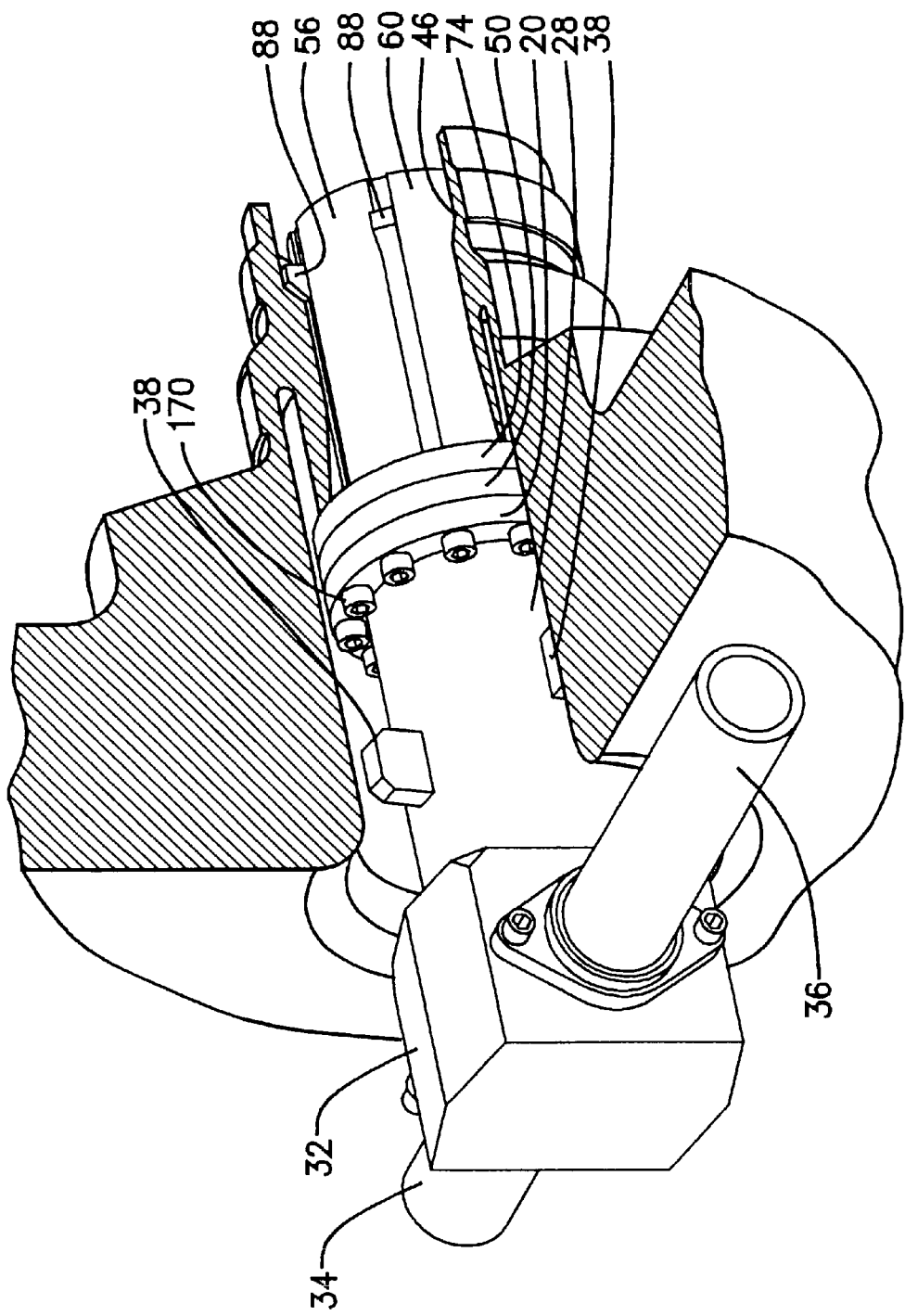
FIG. 5 is a perspective view, with portions cut away, of the embodiment shown in FIG. 1 in an installed condition.

To install the vessel fitting (2) in the opening (6), the vessel fitting is inserted into the breach portion (14) until forward actuator surfaces (92) contact the mating surface (42). Additional force is applied so that the sloped forward actuator surfaces (92) ride up the mating surface (42) and into the orifice (16), while simultaneously moving the beams (76a), (76b), (76c), (76d), (76e) and (76f) from an unflexed position and into a flexed position. As additional force is applied to the vessel fitting, the fitting moves from this partially installed condition to the installed position as shown in FIG. 5. In the installed condition, the first side or surface (80) sealably engages the mating surface (42) and the lock members (88) reside against ledge (48) to retain the lock fitting in the installed condition. If necessary or desired, a gasket (not shown) can be placed between the first side or surface (80) and the mating surface (42) to facilitate the formation of a substantially leakproof joint.

As shown in FIG. 5, the rear actuator surfaces (94) are sloped at an angle similar to the sloped ledge (48). Consequently, as the vessel fitting (2) nears the installed condition, the rear actuator surface will begin to ride down the ledge (48), allowing the beams to return to an unflexed position or at least a partially flexed position. The spring force of the beams that is being released will be applied to the ledge (48) by the rear actuator surfaces (94) to draw the first side or surface (80) of vessel fitting flange (74) into sealing engagement with mating surface (42).

When fluid is pumped through the parts, the beams will contract more so that the vessel (9). Consequently, the length (L5) will shorten relative to the vessel and draw the first side or surface (80) on the vessel fitting flange (74) into a tighter sealing engagement with the mating surface (42).

The different contraction rates can occur because of the larger mass of the vessel, and the fact that fluid pumped through the retainer and vessel fitting is cooler than the fluid held in the vessel. If necessary or desired, the material of the beams might also be made with a material having a different coefficient of thermal expansion then the material used to make the vessel.

The dimensions and materials of the beams may be selected as desired to give the beams the desired degree of strength and resiliency to undergo flexing during the installation process and maintain the vessel fitting flange (74) in sealing engagement with the mating surface (42).

In some applications, after the vessel fitting is in the installed condition, a pipe fitting (18) may be bolted directly to the vessel fitting using bolts (170). In other applications, the pipe fitting and vessel fitting can be provided as an integral unit for installation into the vessel. In such applications the integral unit would be adapted to sealably engage the pipes (34) and (36) in the pipe system.

In other applications, a retainer (10) can be provided in which diameter (D1) of external surface (66) is slightly less than diameter (D2) of the vessel fitting passage surface (98). The slot walls (70a) and (70b) provide a sufficient depth to accommodate beam thickness (102) and slot bottom wall (72) is a sufficient length to accommodate beam width (104). Consequently, to install the retainer (10) on the vessel fitting (2), the distal end (60) of the barrel is positioned adjacent the vessel fitting passage (79) and the slots (68a), (68b), (68c), (68d), (68e) and (68f) are aligned with beams (76a), (76b), (76c), (76d), (76e) and (76f). Since the outer diameter (D1) of the barrel is slightly less than the diameter (D2) of the vessel fitting passage (79), the retainer (10) can be pushed through the passage with the slots slideably engaged to the beams.

The retainer (10) is slid into the vessel fitting (2) until the first side or surface (52) of retainer flange (50) sealably engages the second side or surface (82) of the vessel fitting flange (74). If necessary or desired, a gasket (not shown) can be positioned between these two parts to facilitate the formation of a substantially leakproof joint. The length (L4) of barrel (56) is selected to ensure that the barrel's distal end (60) is adjacent the beam distal ends (86) when the retainer is fully installed. Bolts (170) can be used to fasten the vessel fitting flange (74) to the retainer flange (50) if desired, and additional bolts used to connect the pipe fitting (18) to the retainer (10), or alternatively, the fastening step can take place after the pipe fitting (18) is installed onto the retainer (10), with one set of bolts (170) fastening the pipe fitting, retainer, and vessel fitting together.

With the retainer thus installed, the barrel's external surface (66) will retain the beams (68a), (68b), (68c), (68d), (68e) and (68f) in position with the lock members (88) wedged against the ledge (48).

The second side or surface (54) of the retainer flange (50) is adapted to sealably engage the pipe system, and a gasket (not shown) can be placed between the flange and the pipe fitting parts to facilitate the formation of a substantially leakproof joint. With the pipe fitting (18) installed as shown in FIG. 5, shims (38) will contact or at least be in close proximity to breach wall (40). Consequently, the shims are in position to carry loads that would otherwise be carried by the vessel fitting (2) and retainer (10). After the pipe fitting (18) is secured to the retainer, pipes (34) and (36) can be connected to the T-head (32).

With respect to the embodiment shown in FIG. 4, the installation procedure is similar to that previously described, and differs in that no steps are necessary to join the retainer (110) to the pipe fitting (118).

There are a variety of embodiments having features of the present invention found thereon that may be used to connect a pipe system to an opening or orifice in a vessel wall in a nuclear reactor. Thus, the embodiments disclosed are given to illustrate the configuration and use of the invention. However, they are not intended to limit the scope and spirit of the invention which is set forth in the appended claims.

What is claimed:

1. Apparatus for connecting a pipe system to an opening in a vessel in a nuclear reactor, said opening including an internal mating surface, comprising:
    a. a fitting adapted for installation on the vessel, said vessel fitting having a first side, a second side, and a passage extending therethrough, said first side and said second side dimensioned to fit within the vessel opening;
    b. said first side adapted to sealably engage the vessel adjacent the opening;
    c. said second side adapted to sealably engage the pipe system and position said passage in fluid communication with the pipe system; and
    d. a plurality of resilient beams arranged to extend into the opening and position said passage in at least partial alignment with the opening, each said beam comprising a proximate end adjacent said passage and extending away from said first side to a distal end, and a lock member adapted to lockably engage the vessel when said vessel fitting is installed on the vessel;
    whereby, when the vessel fitting is in an installed condition on the vessel, said first side forms a substantially leakproof seal with the internal mating surface of the vessel opening, said lock member retains the vessel fitting on the vessel, and the said system is in fluid communication with the opening.

2. Apparatus as claimed in claim 1, wherein each said lock member is adapted to lockably engage a ledge in the vessel.

3. Apparatus as claimed in claim 2, wherein said lock members each comprise a forward actuator surface adapted to slideably engage the vessel and move said plurality of beams from an unflexed position into a flexed position when the vessel fitting is in a partially installed condition.

4. Apparatus as claimed in claim 3, wherein said lock members each comprise a rear actuator surface adapted to resiliently bear against the ledge when said vessel fitting is in an installed condition.

5. Apparatus as claimed in claim 3, wherein each said lock member is adjacent respective said distal ends on said plurality of beams.

6. Apparatus as claimed in claim 3, wherein said second side is adapted to sealably engage at least one pipe fitting in the pipe system.

7. Apparatus as claimed in claim 3, wherein said second side is adapted to sealably engage at least one pipe in the pipe system.

8. Apparatus as claimed in claim 3, wherein the second side is adapted to receive a plurality of fasteners for connecting said vessel fitting to the pipe system.

9. Apparatus for connecting a pipe system to an opening in a vessel in a nuclear reactor, comprising:
    a. a vessel fitting adapted for installation on the vessel having;
        1. a first surface adapted to sealably engage the vessel adjacent the opening, a second surface, a passage extending therethrough, and a plurality of resilient beams extending away from said first surface arranged to extend into the opening and position said passage in at least partial alignment with the opening; and
        2. each said beam comprising a lock member adapted to lockably engage the vessel when said vessel fitting is installed on the vessel;
    b. a retainer fitting adapted for installation on said vessel fitting with a flange having a first side and a second side, a barrel with a near end adjacent said first side and extending to a far end, a pipe fitting portion connected to said second side, and a fluid path extending therethrough; and
    c. said barrel adapted to extend through said passage and bear against said plurality of beams when said retainer fitting is installed in said vessel fitting with said fluid path in at least partial alignment with the opening, said first side adapted to sealably engage said second surface, and said pipe fitting portion adapted to sealably engage the pipe system and position said fluid path in fluid communication with said pipe system;
    whereby, when said vessel fitting is in an installed condition on the vessel, and said retainer fitting is in an installed condition on said vessel fitting, said first surface forms a first substantially leakproof seal with the vessel adjacent the opening, said second surface forms a second substantially leakproof seal with said first side, said barrel retains said lock members in lockable engagement with the vessel, and said pipe system is in fluid communication with the opening.

10. Apparatus as claimed in claim 9, wherein said barrel has an external surface with a plurality of slots formed therein, wherein each said slot extends from at least about said near end to at least about said far end, and wherein said plurality of slots are arranged to slideably engage said plurality of beams.

11. Apparatus as claimed in claim 10, wherein each said lock member is adapted to lockably engage a ledge in the vessel.

12. Apparatus as claimed in claim 11, wherein said lock members each comprise a forward actuator surface adapted to slideably engage the vessel and move said plurality of beams from an unflexed position into a flexed position when the vessel fitting is in a partially installed condition on the vessel.

13. Apparatus as claimed in claim 12, wherein each said beam has a proximate end adjacent said passage and extends away from said first surface to a distal end, wherein said lock member is adjacent said distal end.

14. Apparatus as claimed in claim 12, wherein said lock members each comprise a rear actuator surface adapted to resiliently bear against the ledge when said vessel fitting is in an installed condition.

15. Apparatus as claimed in claim 12, wherein said vessel fitting is adapted to receive a plurality of fasteners for connecting said vessel fitting to said retainer fitting.

16. Apparatus for connecting a pipe system to an opening in a vessel in a nuclear reactor, comprising:
   a. a vessel fitting adapted for installation on the vessel having;
      1. a first surface, a second surface, a passage extending therethrough, and a plurality of resilient beams extending away from said first surface arranged to extend into the opening and position said passage in at least partial alignment with the opening; and
      2. each said beam comprising a lock member adapted to lockably engage the vessel when said vessel fitting is installed on the vessel;
   b. a retainer adapted for installation on said vessel fitting with a flange having a first side adapted to sealably engage to said second surface and a second side adapted to sealably engage to a pipe fitting in the pipe system, a barrel with a near end adjacent said first side and extending to a far end, and a fluid path extending therethrough; and
   c. said barrel adapted to extend through said passage and bear against said plurality of beams when said retainer is installed on said vessel fitting with said fluid path in at least partial alignment with the opening;

whereby, when said vessel fitting is in an installed condition on the vessel, and said retainer is in an installed condition in said vessel fitting, said first sealing surface forms a first substantially leakproof seal with the vessel adjacent the opening, said second sealing surface forms a second substantially leakproof seal with said first side, said fluid passage is in fluid communication with the opening, and said barrel retains said lock members in lockable engagement with the vessel.

17. Apparatus as claimed in claim 16, wherein said barrel has an external surface with a plurality of slots formed therein, wherein each said slot extends from at least about said near end to at least about said far end, and wherein said plurality of slots are arranged to slideably engage said plurality of beams.

18. Apparatus as claimed in claim 17, wherein each said lock member is adapted to lockably engage a ledge in the vessel.

19. Apparatus as claimed in claim 18, wherein said lock members each comprise a forward actuator surface adapted to slideably engage the vessel and move said plurality of beams from an unflexed position into a flexed position when the vessel fitting is in a partially installed condition on the vessel.

20. Apparatus as claimed in claim 18, wherein each said beam has a proximate end adjacent said passage and extends away from said first surface to a distal end, wherein said lock member is adjacent said distal end.

\* \* \* \* \*